(12) United States Patent
Masumoto et al.

(10) Patent No.: US 11,652,563 B2
(45) Date of Patent: May 16, 2023

(54) OPTICAL DEMULTIPLEXER, OPTICAL SEPARATION DEVICE, OPTICAL TRANSMISSION SYSTEM, AND OPTICAL TRANSMISSION METHOD

(71) Applicant: Nippon Telegraph and Telephone Corporation, Tokyo (JP)

(72) Inventors: Kana Masumoto, Musashino (JP); Masahiro Nakagawa, Musashino (JP); Hidetoshi Onda, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/626,721

(22) PCT Filed: Jul. 17, 2019

(86) PCT No.: PCT/JP2019/028084
§ 371 (c)(1),
(2) Date: Jan. 12, 2022

(87) PCT Pub. No.: WO2021/009869
PCT Pub. Date: Jan. 21, 2021

(65) Prior Publication Data
US 2022/0360355 A1 Nov. 10, 2022

(51) Int. Cl.
*H04B 10/00* (2013.01)
*H04J 14/02* (2006.01)
(Continued)

(52) U.S. Cl.
CPC ...... *H04J 14/0234* (2013.01); *H04J 14/0223* (2013.01); *H04J 14/0226* (2013.01); *H04J 14/08* (2013.01)

(58) Field of Classification Search
CPC .... H04B 10/27; H04B 10/271; H04B 10/272; H04B 10/2725; H04B 10/275;
(Continued)

(56) References Cited

U.S. PATENT DOCUMENTS

2010/0254705 A1* 10/2010 Perkins ............... H04J 14/0204
398/48

OTHER PUBLICATIONS

Archambault et al., "Design and Simulation of Filterless Optical Networks: Problem Definition and Performance Evaluation," J. Opt. Commun. Netw., 2010, 2(8)496-501.
(Continued)

*Primary Examiner* — Daniel G Dobson
(74) *Attorney, Agent, or Firm* — Fish & Richardson P.C.

(57) ABSTRACT

An optical demultiplexer 40 includes: a plurality of optical gate switches 41a to 41n configured to transmit, when being turned on, and to block, when being turned off, a multiplexed optical signal obtained by multiplexing optical signals of a plurality of wavelengths by time-division multiplexing or wavelength-division multiplexing in addition to time-division multiplexing; and a cAWG 42 including a plurality of input ports and a plurality of output ports and configured to input the multiplexed optical signal transmitted through the optical gate switches 41a to 41n from the plurality of input ports, demultiplex the input multiplexed optical signal for each wavelength, and cycle and output the demultiplexed optical signals from the plurality of output ports in a predetermined order.

8 Claims, 14 Drawing Sheets

(51) Int. Cl.
*H04J 14/08* (2006.01)
*H04J 14/00* (2006.01)

(58) Field of Classification Search
CPC .............. H04B 10/2755; H04B 10/278; H04J 14/0201; H04J 14/0202; H04J 14/0204; H04J 14/021; H04J 14/0212; H04J 14/023; H04J 14/0239; H04J 14/0242; H04J 14/0278; H04J 14/028; H04J 14/0282; H04J 14/0283; H04J 14/08; H04J 14/083; H04Q 2011/0032; H04Q 2011/0033

See application file for complete search history.

(56) References Cited

OTHER PUBLICATIONS

Furdek et al., "Programmable Filterless Network Architecture Based on Optical White Boxes," 20th International Conference on Optical Network Design and Modeling, May 9, 2016, 6 pages.

Okada et al., "Verification of wavelength routing function by Wavelength Transfer Matrix for WDM networks," Seikei University Science and Engineering Research Report, 2006, 43(2):75-81, 15 pages (with English Translation).

\* cited by examiner

OPTICAL DEMULTIPLEXER, OPTICAL SEPARATION DEVICE, OPTICAL TRANSMISSION SYSTEM, AND OPTICAL TRANSMISSION METHOD

CROSS-REFERENCE TO RELATED APPLICATIONS

This application is a National Stage application under 35 U.S.C. § 371 of International Application No. PCT/JP2019/028084, having an International Filing Date of Jul. 17, 2019, the disclosure of which is considered part of the disclosure of this application, and is incorporated in its entirety into this application.

TECHNICAL FIELD

The present invention relates to an optical demultiplexer, an optical separator, an optical transmission system, and an optical transmission method for multiplexing optical signals of a plurality of wavelengths to be transmitted through one optical fiber and dividing the multiplexed signal into optical signals of respective wavelengths on a reception side to be received.

BACKGROUND ART

Currently, there is an optical transmission system in which in the case of transmitting and receiving optical signals of a plurality of wavelengths between communication nodes, the optical signals are multiplexed to be transmitted through an optical fiber, and the multiplexed signal is divided into optical signals of respective wavelengths at a node on a reception side to be received.

Many optical transmission systems each use a colored network in which an optical signal of one wavelength is assigned to one transponder of a communication node. In this network, when a set wavelength is changed in a remotely-located transponder connected by an optical fiber as an optical transmission line, a change operation must be performed at the site.

Thus, in recent years, it has become popular to make a network colorless as one method for improving flexibility and extensibility of the network. Making a network colorless means a method in which a wavelength of an optical signal can be changed in a transponder by an instruction from a remote location to reduce local work.

As this type of optical transmission system, there is an optical transmission system having a star configuration illustrated in FIG. 10, for example. Time- and wavelength-division multiplexing (TWDM), which is a hybrid method of time-division multiplexing (TDM) and wavelength-division multiplexing (WDM), is applied to an optical transmission system 10 illustrated in FIG. 10.

The optical transmission system 10 includes: two optical couplers 12a and 12b disposed apart from each other in remote locations and connected to each other by one optical fiber 11; and a plurality (n) of transmission nodes 14a, 14b, 14c, . . . , and 14n connected to one of the optical couplers 12a by individual optical fibers 13. Furthermore, the optical transmission system 10 includes: n T filters (tunable filters) 16a, 16b, 16c, . . . , and 16n connected to the other of the optical couplers 12b by individual optical fibers 15; and n reception nodes 18a, 18b, 18c, . . . , and 18n connected to the n T filters 16a to 16n by individual optical fibers 17.

Here, the transmission nodes 14a to 14n transmit information in the present example, but can also receive information. The reception nodes 18a to 18n receive information, but can also transmit information.

The transmission node 14a includes a transponder 21a, an optical receiver 22a, and an optical transmitter 23a. The transmission node 14b includes a transponder 21b, an optical receiver 22b, and an optical transmitter 23b. The transmission node 14c includes a transponder 21c, an optical receiver 22c, and an optical transmitter 23c. The transmission node 14n includes a transponder 21n, an optical receiver 22n, and an optical transmitter 23n.

The reception node 18a includes a transponder 25a, an optical transmitter 27a, and an optical receiver 26a. The reception node 18b includes a transponder 25b, an optical transmitter 27b, and an optical receiver 27b. The reception node 18c includes a transponder 25c, an optical transmitter 27c, and an optical receiver 26c. The reception node 18n includes a transponder 25n, an optical transmitter 27n, and an optical receiver 26n.

Here, the transponders 21a to 21n, and 25a to 25n have the same function. The optical transmitters 23a to 23n, and 27a to 27n have the same function to perform burst transmission or the like, but wavelengths of optical signals that can be transmitted are different as described later. The optical receivers 22a to 22n, and 26a to 26n have the same function, but wavelengths of optical signals that can be received are different as described later.

The transponder 21a of the transmission node 14a relays information transmitted from a communication terminal (not illustrated) of a user or the like by carrying out relay processing involving mutual conversion between an optical signal and an electrical signal. The optical transmitter 23a superimposes the information relayed by the transponder 21a on an optical signal of a wavelength $\lambda 1$, stores the superimposed optical signal of the wavelength $\lambda 1$ (also referred to as "optical signal $\lambda 1$") in a time slot t1, and transmits the optical signal $\lambda 1$ stored in the time slot t1 to the optical coupler 12a via the optical fiber 13.

The optical transmitter 23b of the transmission node 14b superimposes information relayed by the transponder 21b on an optical signal of a wavelength $\lambda 1$, stores this optical signal $\lambda 1$ in a time slot t2, and transmits the optical signal $\lambda 1$ stored in the time slot t2 to the optical coupler 12a via the optical fiber 13.

The optical transmitter 23c of the transmission node 14c superimposes information relayed by the transponder 21c on an optical signal of a wavelength $\lambda 2$, stores the superimposed optical signal of the wavelength $\lambda 2$ (also referred to as "optical signal $\lambda 2$") in the time slot t1, and transmits the optical signal $\lambda 2$ stored in the time slot t1 to the optical coupler 12a via the optical fiber 13.

The optical transmitter 23n of the transmission node 14n superimposes information relayed by the transponder 21n on an optical signal of a wavelength $\lambda n$, stores the superimposed optical signal of the wavelength $\lambda n$ (also referred to as "optical signal $\lambda n$") in the time slot t1, and transmits the optical signal $\lambda n$ stored in the time slot t1 to the optical coupler 12a via the optical fiber 13.

The optical coupler 12a multiplexes the optical signals $\lambda 1$ to $\lambda n$ from the transmission nodes 14a to 14n by TWDM. The optical signals $\lambda 1$ to $\lambda n$ as the multiplexed TWDM signal are transmitted to the other of the optical couplers 12b via the optical fiber 11. Note that the multiplexed optical signals $\lambda 1$ to $\lambda n$ are to be referred to as a "multiplexed optical signal $\lambda 1$ to $\lambda n$".

The optical coupler 12b branches the multiplexed optical signals $\lambda 1$ to $\lambda n$ transmitted from the optical fiber 11 into n pieces and transmits the branched optical signals to the n T filters 16a to 16n which are active filters, via the optical fiber 15.

The T filters 16a to 16n each transmit only an optical signal of a predetermined wavelength among the optical signals λ1 to λn, and transmit the optical signal to a corresponding one of the optical receivers 26a to 26n of a corresponding one of the reception nodes 18a to 18n, via the optical fiber 17. A transmission band in which the T filters 16a to 16n each transmit only an optical signal of a predetermined wavelength is changed by remote instruction.

The T filter 16a transmits only the optical signal λ1 among the optical signals λ1 to λn and transmits the optical signal λ1 to the optical receiver 26a of the reception node 18a via the optical fiber 17. In the present example, the optical signal λ1 of the time slot t1 and the optical signal λ1 of the time slot t2 are transmitted to the optical receiver 26a. The T filter 16b transmits only the optical signal λ2 of the time slot t1 to the optical receiver 26b. The T filter 16n transmits only the optical signal λn of the time slot t1 to the optical receiver 26n.

The optical receiver 26a receives the optical signals λ1 and λ1 of the time slots t1 and t2. The transponder 25a relays the received optical signals λ1 and λ1 of the time slots t1 and t2 to a communication terminal. The optical receiver 26b receives the optical signal λ2 of the time slot t1, and the transponder 25b relays the received optical signal λ2 to a communication terminal. The optical receiver 26n receives the optical signal λn of the time slot t1, and the transponder 25n relays the received optical signal λn to a communication terminal.

In this manner, the optical signals of the respective wavelengths λ1 to λn transmitted from the transmission nodes 14a to 14n are received at the reception nodes 18a to 18n at remote locations, via the optical fiber 11.

In this optical transmission system 10, the T filters 16a to 16n are used, but as in an optical transmission system 10A illustrated in FIG. 11, a wavelength selective switch (WSS) 30, which is an active filter, may be used.

The WSS 30 is connected between the other end of the optical fiber 11 having one end connected to the optical coupler 12a and the optical receivers 26a to 26n. Each output port of the WSS 30 is connected to each of the optical receivers 26a to 26n.

The WSS 30 is an optical switch having a function capable of changing a combination of a wavelength and an output port by remote control, in addition to wavelength multiplexing/demultiplexing functions for connecting time- and wavelength-division multiplexed optical signals λ1 to λn to be transmitted to the optical fiber 11 to a different output port for each of the wavelengths λ1 to λn. In other words, when the WSS 30 is used, it is possible to indicate which optical signal of optical signals of the wavelengths λ1 to λn is to be transmitted to which optical receiver of the optical receivers 26a to 26n.

As the technology for configuring the above-described type of optical transmission system 10 or 10A, there are exemplified technologies described in NPLs 1, 2, and 3.

CITATION LIST

Non Patent Literature

NPL 1: Okada et al., "Verification of Wavelength Routing Function by Wavelength Transfer Matrix networks", Research Report, Fac. Sci. Tech., Seikei Univ. Vol. 43 No. 2 (2006), pp. 75-81.

NPL 2: Emile Archambault et al., "Design and Simulation of Filterless Optical Networks: Problem Definition and Performance Evaluation", J. OPT. COMMUN. NETW./VOL. 2, No. 8/August 2010.

NPL 3: Marij a Furdek et al., "Programmable Filterless Network Architecture Based on Optical White Boxes", 20th International Conference on Optical Network Design and Modeling (ONDM 2016), May 9-12, 2016, Cartagena, Spain.

SUMMARY OF THE INVENTION

Technical Problem

However, in the above-described optical transmission systems 10 and 10A, the T filters 16a to 16n and the WSS 30, each of which is an active filter, are used. In the active filter, due to aging deterioration or failure, the transmission band shifts or is narrowed as described later, resulting in a variation in transmission wavelength. As a result, there is a problem in that an optical signal of a target wavelength (for example, the wavelength λ1) cannot be appropriately transmitted, resulting in communication interruption.

FIG. 12 illustrates an example in which the transmission band of the T filter 16a shifts. When there is no deterioration or failure in the T filter 16a, the T filter 16a transmits the optical signal of the target wavelength λ1 in the transmission band λ1a to λ1d, as illustrated on the T filter output side. However, when due to deterioration or failure, the center λ1 of the transmission band λ1a to λ1d of the T filter 16a shifts to λ1a as indicated by an arrow Y1, the transmission bandwidth becomes λ0 to λ1, such that it is not possible to properly transmit the optical signal of the target wavelength λ1.

FIG. 13 illustrates an example of narrowing of the band of the T filter 16a. It is assumed that due to deterioration or failure of the T filter 16a, the transmission band λ1a to λ1d of the T filter 16a that transmits the optical signal of the target wavelength λ1 has been narrowed to a transmission band λ1b to λ1c narrower than the bandwidth of the target wavelength λ1, as indicated by opposing arrows Y2 and Y3. For example, in a case where the transmission band is narrowed to ½ of the band of the target wavelength λ1, it becomes impossible to properly transmit the optical signal of the target wavelength λ1.

In a flexible network, as illustrated in FIG. 14, widths (grid spacings) of transmission bands λa, λb, λc, and λd of the T filter 16a becomes narrower. It is assumed that in this case, the transmission band has shifted by shifting or narrowing of the transmission band of the T filter 16a, as from a dashed frame 71 to a dashed frame 72 indicated by an arrow Y4. When only ¹/₁₀ of an optical signal of a predetermined wavelength can be transmitted, for example, it becomes more difficult to transmit the optical signal of the target wavelength λ1.

The present invention has been made in view of such circumstances, and an object of the present invention is to eliminate a variation in transmission wavelength when an optical signal of a predetermined wavelength is transmitted, and to properly transmit an optical signal of a target wavelength to suppress communication interruption.

Means for Solving the Problem

In order to solve the above problems, an optical demultiplexer according to an aspect of the present invention includes: a plurality of optical gate switches, each of which is configured to transmit, when being turned on, and to block, when being turned off, a multiplexed optical signal, the multiplexed optical signal being obtained by multiplexing optical signals of a plurality of wavelengths by time-division multiplexing or multiplexing optical signals of a plurality of wavelengths by wavelength-division multiplexing in addition to time-division multiplexing; and a cyclic arrayed waveguide grating (cAWG) including a plurality of input ports and a plurality of output ports and configured to input the multiplexed optical signal transmitted through the optical gate switches from the plurality of input ports, demultiplex the input multiplexed optical signal for each wavelength, and cycle and output the demultiplexed optical signals from the plurality of output ports in a predetermined order.

Effects of the Invention

According to the present invention, it is possible to eliminate a variation in transmission wavelength when an optical signal of a predetermined wavelength is transmitted, and to properly transmit an optical signal of a target wavelength to suppress communication interruption.

DESCRIPTION OF EMBODIMENTS

Hereinafter, an embodiment of the present disclosure will be described with reference to the drawings. Here, in all the drawings of the present specification, components having corresponding functions are denoted by the same reference signs and description thereof will be appropriately omitted.

Configuration of First Embodiment

Figure 1:
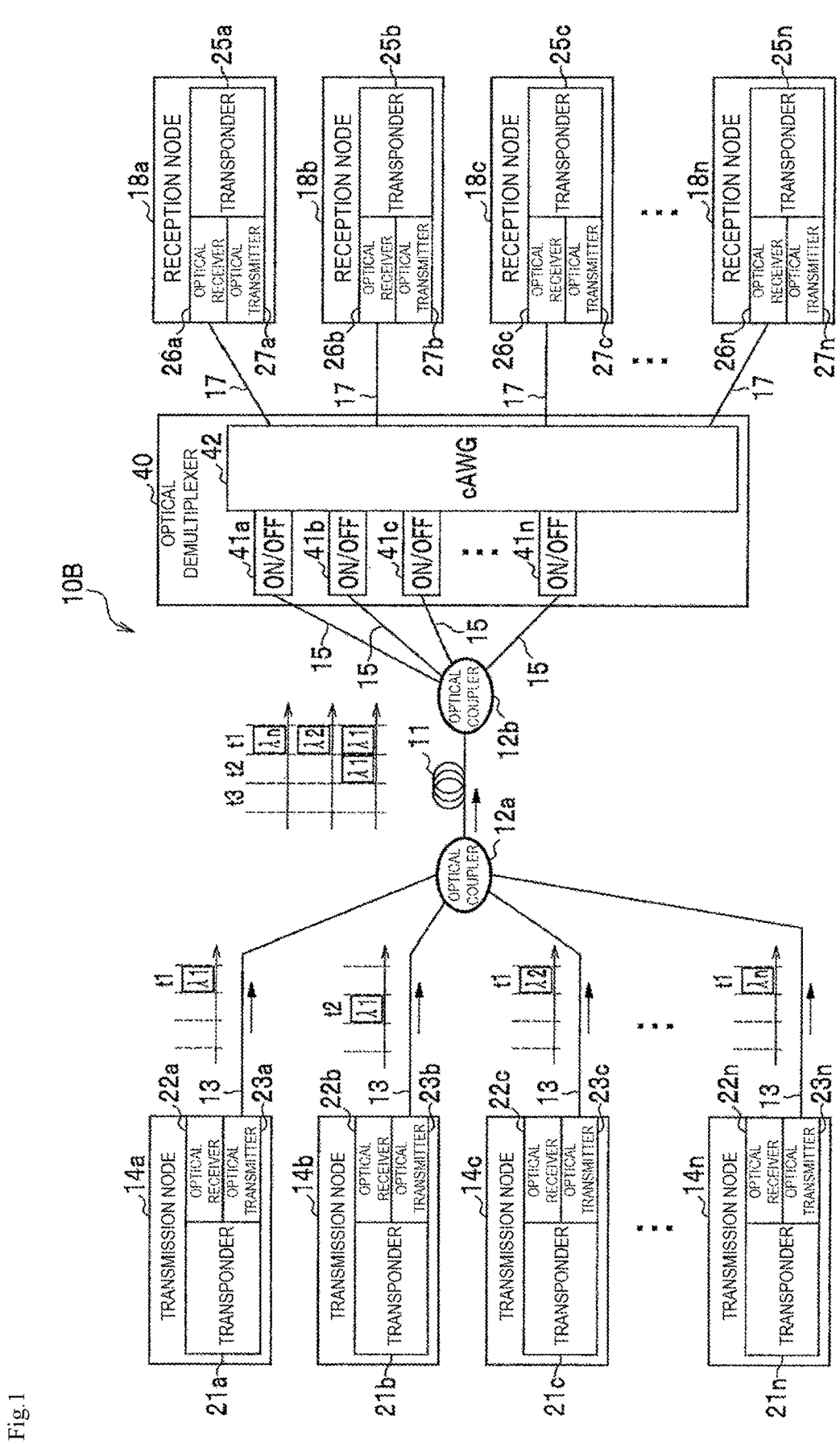
FIG. 1 is a block diagram illustrating an optical transmission system to which an optical demultiplexer according to a first embodiment of the present invention is applied, the optical transmission system having a star configuration.

FIG. 1 is a block diagram illustrating an optical transmission system to which an optical demultiplexer according to a first embodiment of the present invention is applied, the optical transmission system having a star configuration.

Figure 10:
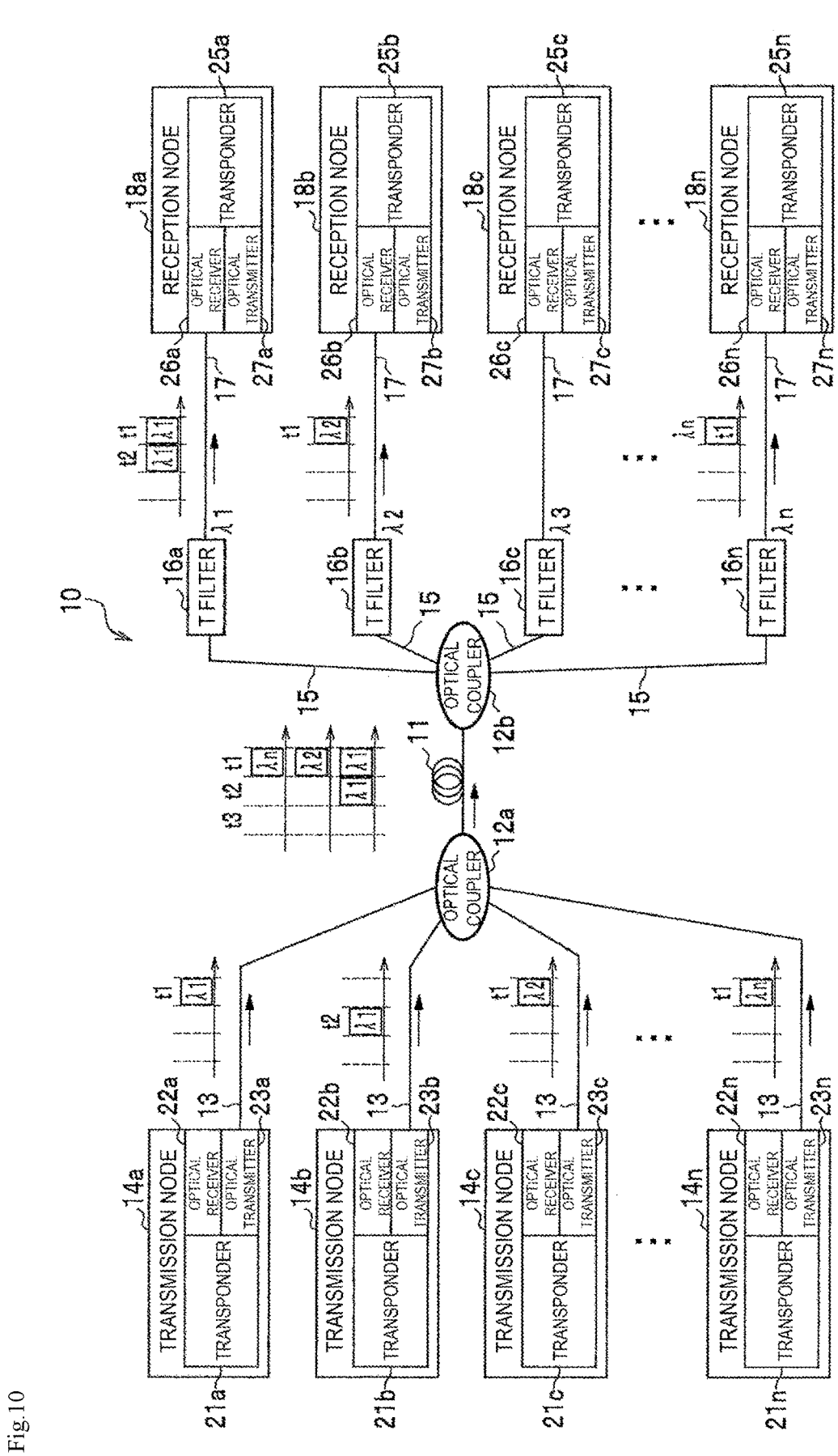
FIG. 10 is a block diagram illustrating a configuration in which a T filter is used in an optical transmission system of a star configuration of the related art.
Figure 11:
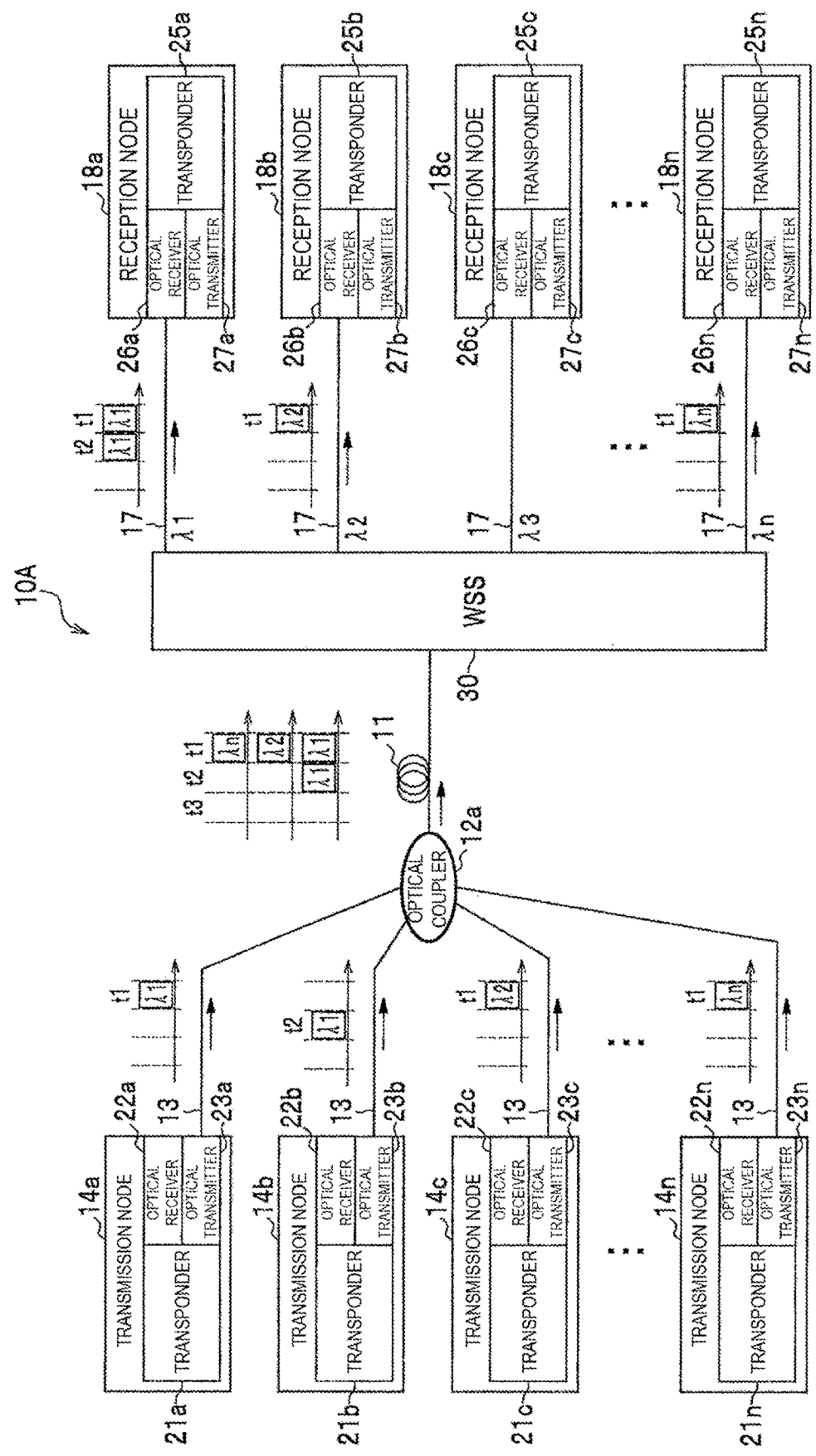
FIG. 11 is a block diagram illustrating a configuration in which a WSS is used in the optical transmission system of a star configuration of the related art.
Figure 12:
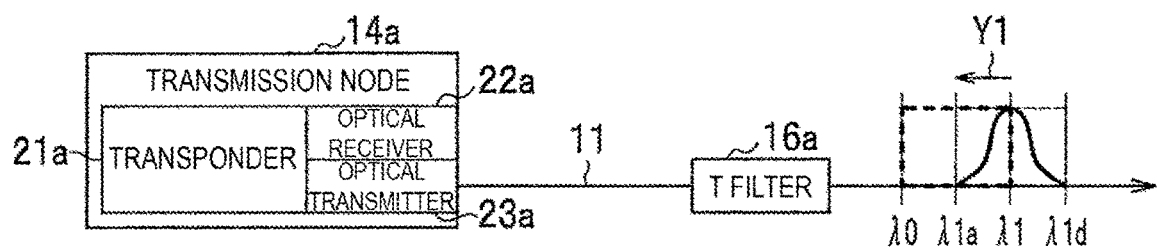
FIG. 12 is a diagram illustrating an example in which a transmission band of the T filter shifts.
Figure 13:
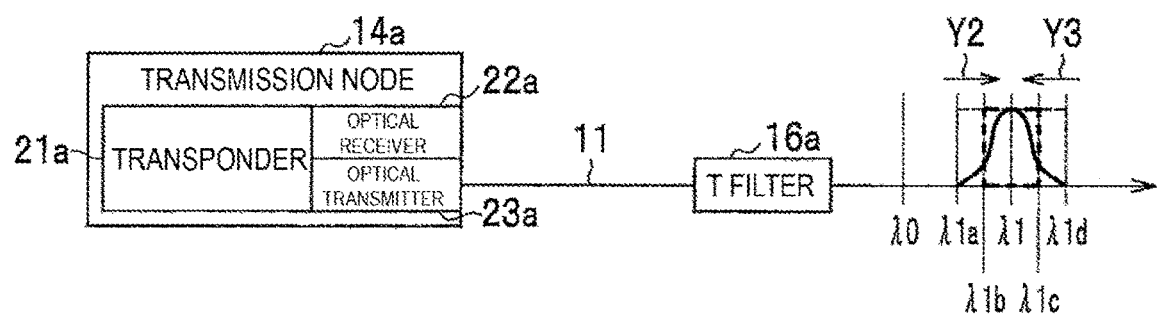
FIG. 13 is a diagram illustrating an example of narrowing of a band of the T filter.
Figure 14:
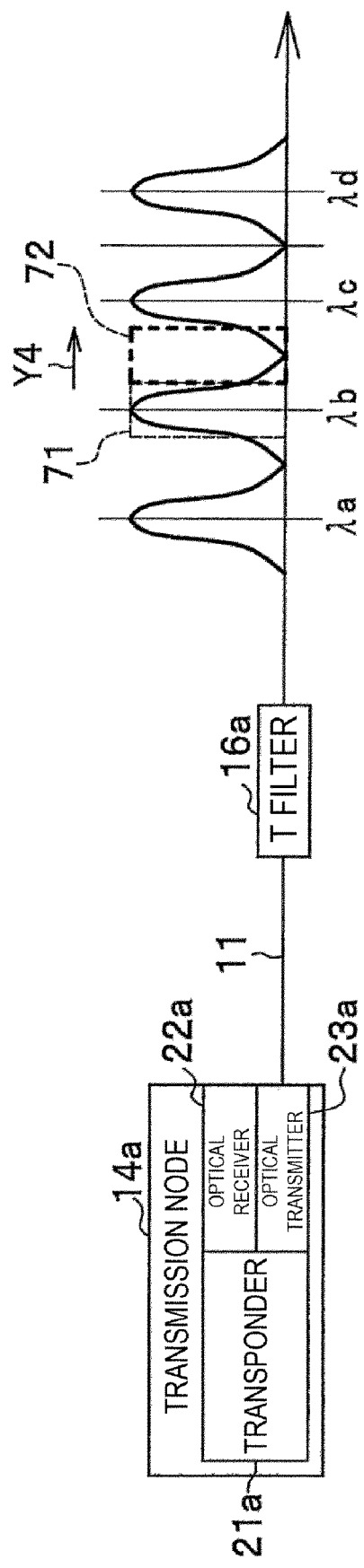
FIG. 14 is a diagram illustrating that a width (grid spacing) of the transmission band of the T filter becomes narrower.

An optical transmission system 10B illustrated in FIG. 1 is different from the related-art optical transmission system 10 described above (FIG. 10) in that the optical transmission system 10B uses an optical demultiplexer 40 in place of the T filters 16a to 16n (FIG. 10). The optical demultiplexer 40 includes the same number of optical gate switches 41a, 41b, 41c, . . . , and 41n as the number of branches n of an optical coupler 12b and a cyclic arrayed waveguide grating (cAWG) 42.

The optical gate switches 41a to 41n utilize, for example, intensity modulation of electro-optic (EO) modulation or LN (phase) modulation to turn on/off (ON/OFF) an optical signal in response to an electric field intensity. The optical gate switches 41a to 41n transmit, when being turned on, and block, when being turned off, optical signals of wavelengths λ1 to λn (optical signals λ1 to λn) from the optical coupler 12b.

The cAWG 42 includes n×n input/output ports, n input ports of which are connected to output sides of the n optical gate switches 41a to 41n, and n output ports of which are connected to n optical receivers 26a to 26n.

Figure 2:
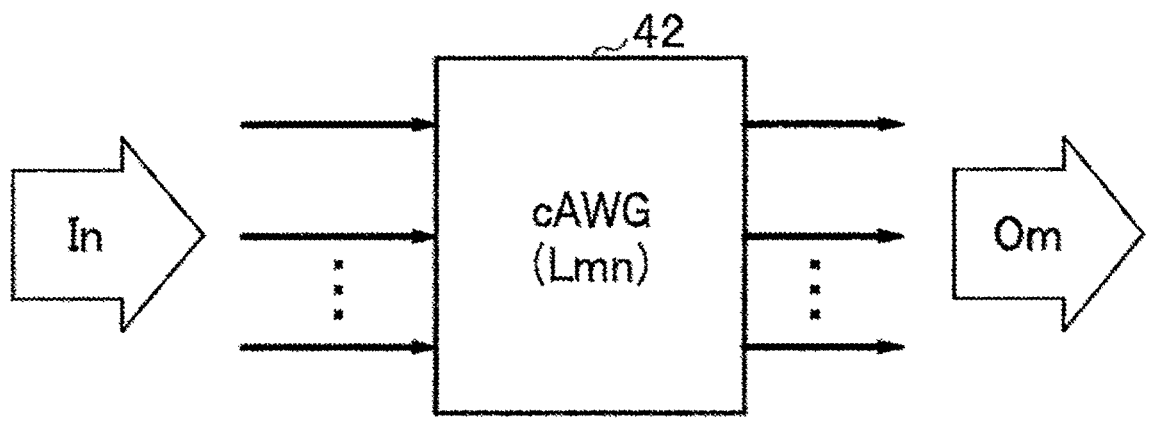
FIG. 2 is an operating principle diagram of a cAWG.

The cAWG 42 will be described with reference to FIG. 2. The cAWG 42 illustrated in FIG. 2 has n inputs and m outputs and is a passive component, and the interior of which is a wavelength circuit of a wavelength transmission matrix Lmn. Here, it is assumed that m of the m outputs is the same number as n.

When optical signals of a plurality of wavelengths (wavelength group) are input from the In side, a wavelength group of a sequence different from that of the wavelength group on the input side In is output from the Om side after processing in the wavelength circuit of the wavelength transmission matrix Lmn of the cAWG 42. The wavelength transmission matrix Lmn is a two-dimensional matrix and is defined by the following Equation (1):

$$Om = Lmn \times In \quad (1)$$

In Equation (1), Om is an output matrix of m rows and I columns, Lmn is a wavelength transmission matrix of m rows and n columns of the wavelength circuit, and In is an input matrix of n rows and I columns.

Figure 3:
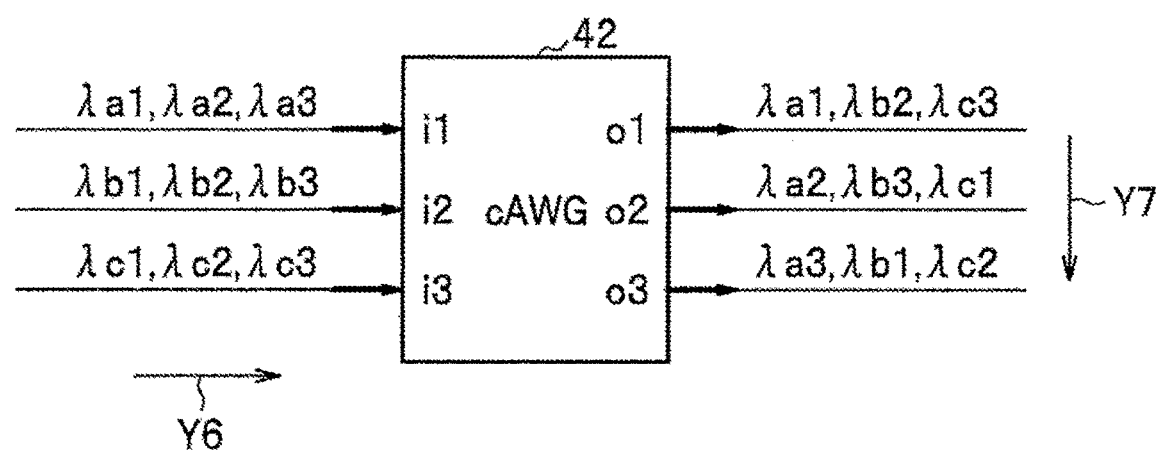
FIG. 3 is a diagram for explaining an input-output operation of the cAWG.

An example of the cAWG 42 of 3×3 in FIG. 3 is illustrated and described as an example based on the wavelength transmission matrix Lmn. The cAWG 42 has three input ports i1, i2, and i3 and three output ports o1, o2, and o3.

In the cAWG 42, in a lateral direction indicated by an arrow Y6, optical signals of wavelengths λa1, λa2, and λa3 having different frequencies are input to an input port i1. In response to this input, in a vertical direction indicated by an arrow Y7, an optical signal of a wavelength λa1 is output from an output port o1, an optical signal of a wavelength λa2 is output from an output port o2, and an optical signal of a wavelength λa3 is output from an output port o3.

Similarly, optical signals of wavelengths λb1, λb2, and λb3 having different frequencies are input to an input port i2. In response to this input, an optical signal of a wavelength λb2 is output from the output port o1, an optical signal of a wavelength λb3 is output from the output port o2, and an optical signal of a wavelength λb1 is output from the output port o3.

Further, optical signals of wavelengths λc1, λca, and λc3 having different frequencies are input to an input port i3. In response to this input, an optical signal of a wavelength λc3 is output from the output port o1, an optical signal of a wavelength λc1 is output from the output port o2, and an optical signal of a wavelength λc2 is output from the output port o3.

In this manner, the cAWG 42 performs processing (cyclic processing or wavelength routing processing) to demultiplex optical signals of a plurality of wavelengths input from one input port and output the demultiplexed optical signals while the n output ports are cycled. The processing is similarly performed for a plurality of optical signals input from the n input ports. Here, the wavelength routing processing is performed by the wavelength circuit of the wavelength transmission matrix Lmn.

Next, in the optical transmission system 10B illustrated in FIG. 1, a transponder 21a of a transmission node 14a relays information transmitted from a communication terminal (not illustrated) of a user or the like and outputs the information to an optical transmitter 23a. The optical transmitter 23a superimposes the relayed information on the optical signal of the wavelength λ1, stores the optical signal (optical signal λ1) of the wavelength λ1 after superposition in a time slot t1, and transmits the optical signal λ1 stored in the time slot t1 to an optical coupler 12a (one optical coupler) via an optical fiber 13. This transmission is burst transmission. In other words, the transmission node 14a stores the optical signal 1, on which the information received from the communication terminal is superimposed, in the time slot t1 and transmits the optical signal λ1 stored in the time slot t1 to the optical coupler 12a.

Similarly, transmission nodes 14b to 14n also transmit optical signals λ1, λ2, and λn to the optical coupler 12a. At this time, the transmission node 14b stores the optical signal λ1 in a time slot t2 and transmits the optical signal λ1 stored in the time slot t2, the transmission node 14c stores the optical signal λ2 in the time slot t1 and transmits the optical signal λ2 stored in the time slot t1, and the transmission node 14n stores the optical signal λn in the time slot t1 and transmits the optical signal λn stored in the time slot t1.

The optical coupler 12a multiplexes the optical signals λ1 to λn from the transmission nodes 14a to 14n by TWDM, and transmits the multiplexed optical signal (TWDM signal) λ1 to kn to the other optical coupler 12b via an optical fiber 11.

The optical coupler 12b branches the multiplexed optical signal λ1 to λn from the optical fiber 11 into n pieces, and transmits the branched optical signals to the n optical gate switches 41a to 41n via an optical fiber 15.

The optical receivers 26a to 26n of reception nodes 18a to 18n receive optical signals output from the cAWG 42 in response to ON/OFF of the optical gate switches 41a to 41n. Transponders 25a to 25n relay the received optical signals to communication terminals.

First Operation of First Embodiment

Figure 4:
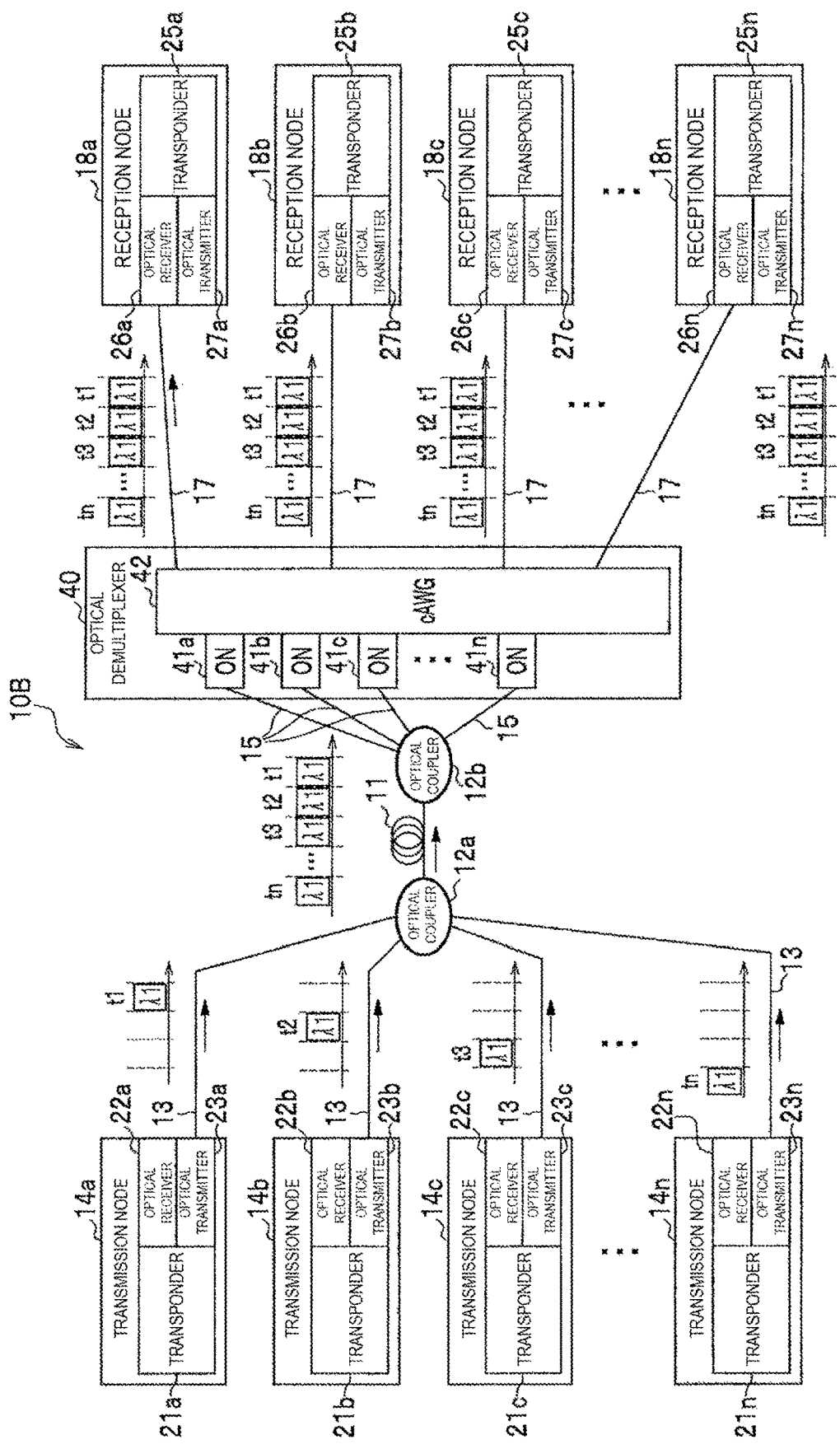
FIG. 4 is a block diagram for explaining a first operation by TDM of an optical transmission system according to the first embodiment.

Next, a first operation by TDM of the optical transmission system 10B according to the first embodiment illustrated in FIG. 4 will be described.

Optical signals λ1, λ1, . . . , and λ1 on which information received from a communication terminal is superimposed is transmitted to the optical coupler 12a by the transmission nodes 14a to 14n. At this time, the transmission node 14a stores an optical signal λ1 in the time slot t1 and transmits the optical signal λ1 stored in the time slot t1, the transmission node 14b stores an optical signal λ1 in a time slot t2 and transmits the optical signal λ1 stored in the time slot t2, the transmission node 14c stores an optical signal λ1 in a time slot t3 and transmits the optical signal λ1 stored in the time slot t3, and the transmission node 14n stores an optical signal λ1 in a time slot tn and transmits the optical signal λ1 stored in the time slot tn.

The optical coupler 12a time-division-multiplexes the optical signals λ1 of the time slots t1 to tn from the transmission nodes 14a to 14n and transmits the multiplexed optical signal λ1 of the time slots t1 to tn to the other optical coupler 12b via the optical fiber 11.

The optical coupler 12b branches the multiplexed optical signal λ1 of the time slots t1 to tn from the optical fiber 11 to n pieces, and transmits the branched optical signals to the n optical gate switches 41a to 41n via the optical fiber 15.

Here, it is assumed that all the optical gate switches 41a to 41n are turned on. In this case, the multiplexed optical signal λ1 of the time slots t1 to tn is transmitted through each of the optical gate switches 41a to 41n and is input to each of the input ports of the cAWG 42.

The cAWG 42 performs wavelength routing processing on the optical signal λ1 of the time slots t1 to tn input from each of the input ports to output the optical signal λ1 of the time slots t1 to tn from each of the output ports. This optical signal λ1 of the time slots t1 to tn is received at each of the optical receivers 26a to 26n of the reception nodes 18a to 18n, and is relayed to a communication terminal by each of the transponders 25a to 25n.

Second Operation of First Embodiment

Next, a second operation by TWDM of the optical transmission system 10B according to the first embodiment illustrated in FIG. 5 will be described with reference to the flowchart illustrated in FIG. 6 together.

Figure 5:
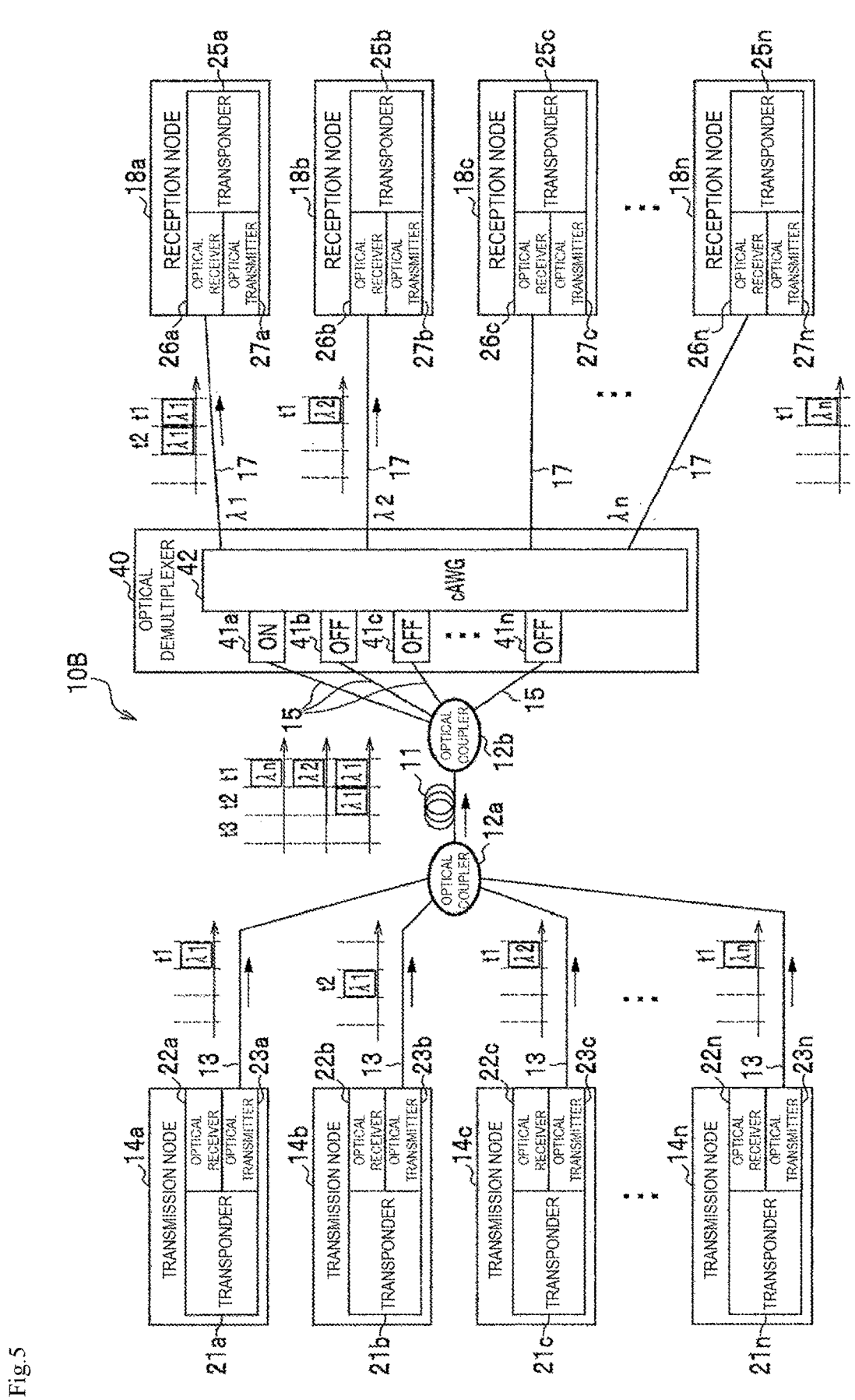
FIG. 5 is a block diagram for explaining a second operation by TWDM of the optical transmission system according to the first embodiment.
Figure 6:
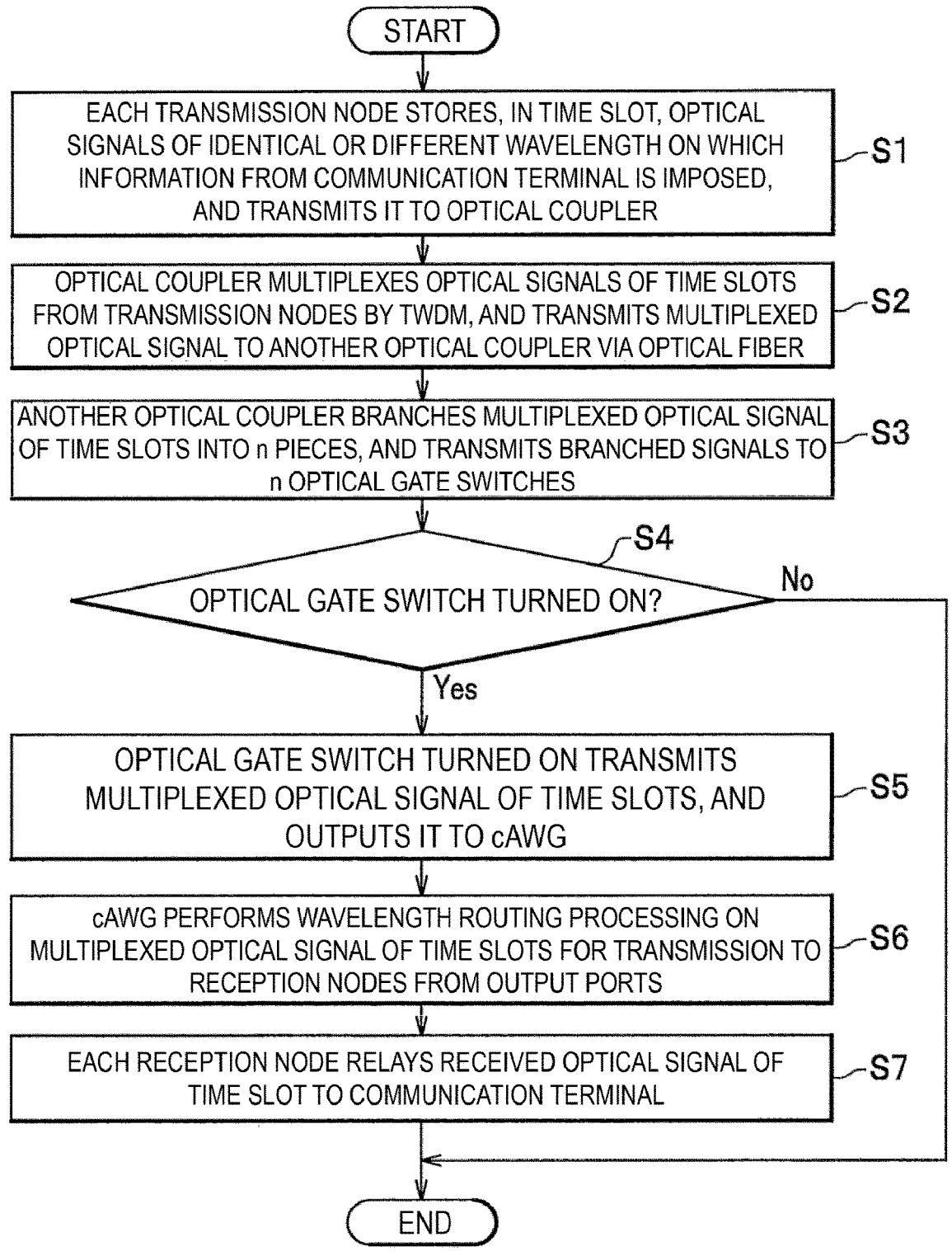
FIG. 6 is a flowchart for explaining the second operation.

In step S1 illustrated in FIG. 6, optical signals λ1, λ2, . . . , and λn of a plurality of wavelengths on which the information received from a communication terminal is superimposed are transmitted to the optical coupler 12a by the transmission nodes 14a to 14n illustrated in FIG. 5. At this time, the transmission node 14a stores an optical signal λ1 in the time slot t1 and transmits the optical signal λ1 stored in the time slot t1, the transmission node 14b stores an optical signal λ1 in the time slot t2 and transmits the optical signal λ1 stored in the time slot t2, the transmission node 14c stores an optical signal λ2 in the time slot t1 and transmits the optical signal λ2 stored in the time slot t1, and the transmission node 14n stores an optical signal λn in the time slot t1 and transmits the optical signal λn stored in the time slot t1.

In step S2, the optical coupler 12a multiplexes the optical signals λ1 of the time slots t1 to tn from the transmission nodes 14a to 14n by TWDM. In the TWDM, two optical signals each having an identical wavelength λ1 are time-division-multiplexed in the time slots t1 and t2 and optical signals of the plurality of wavelengths λ1, λ2, . . . , and λn are wavelength-division-multiplexed to be multiplexed. This multiplexed optical signal λ1 of the time slots t1 to tn is transmitted to the other optical coupler 12b via the optical fiber 11.

In step S3, the optical coupler 12b branches the multiplexed optical signal λ1 of the time slots t1 to to from the optical fiber 11 into n pieces and transmits the branched optical signals to the n optical gate switches 41a to 41n via the optical fiber 15.

Here, at step S4, it is determined whether the optical gate switches 41a to 41n each are turned on. As a result, when all the optical gate switches 41a to 41n are not turned on but turned off, a transmission operation of the optical signal is terminated.

On the other hand, when it is determined that only the optical gate switch 41a is turned on, in step S5, the optical gate switch 41a transmits the multiplexed optical signals λ1, λ1, . . . , and λn of the time slots t1 and t2 from the optical coupler 12b and outputs the optical signal to a first input port of the cAWG 42.

In step S6, the cAWG 42 performs wavelength routing processing on the multiplexed optical signals λ1, λ1, . . . , and λn of the time slots t1 and t2 input from the first input port. This wavelength routing processing causes the cAWG 42 to output the optical signals λ1 of the time slots t1 and t2 from an output port connected to the optical receiver 26a of the reception node 18a. The cAWG 42 also outputs the optical signal λ2 of the time slot t1 from an output port connected to the optical receiver 26b of the reception node 18b. The cAWG 42 also outputs the optical signal λn of the time slot t1 from an output port connected to the optical receiver 26n of the reception node 18n.

In step S7, in the reception nodes 18a to 18n, the optical signals λ1 of the time slots t1 and t2 received by the optical receiver 26a are relayed and transmitted to communication terminals. Similarly, the optical signal λ2 of the time slot t1 received by the optical receiver 26b and the optical signal λn of the time slot t1 received by the optical receiver 26n are relayed and transmitted to communication terminals.

Third Operation of First Embodiment

Figure 7:
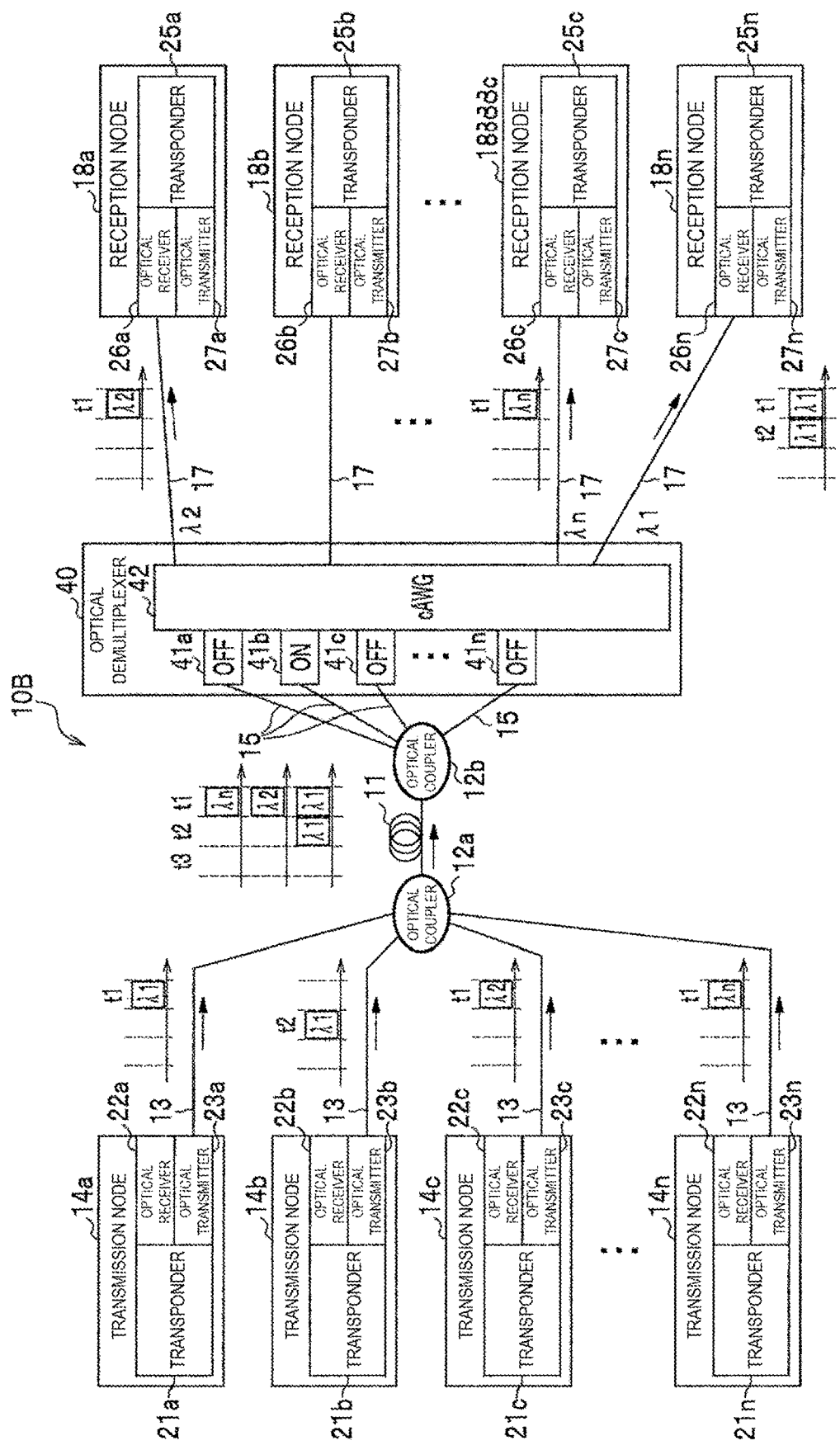
FIG. 7 is block diagram for explaining a third operation by TWDM of the optical transmission system according to the first embodiment.

Next, a third operation by TWDM of the optical transmission system 10B according to the first embodiment illustrated in FIG. 7 will be described with reference to the flowchart illustrated in FIG. 6 together.

This third operation performs similar processing from step S1 to step S4 illustrated in FIG. 6.

When it is determined from the determination result in step S4 that only the optical gate switch 41b is turned on, in step S5, the optical gate switch 41b transmits the multiplexed optical signals λ1, λ1, . . . , and λn of the time slots t1 and t2 from the optical coupler 12b and inputs the optical signal to a second input port of the cAWG 42.

In step S6, the cAWG 42 performs wavelength routing processing on the multiplexed optical signals λ1, λ1, . . . , and λn of the time slots t1 and t2 input from the second input port. This wavelength routing processing causes the cAWG 42 to output the optical signal λ2 of the time slot t1 from an output port connected to the optical receiver 26a. The cAWG 42 outputs the optical signal λn of the time slot t1 from an output port connected to the optical receiver 26c. The cAWG 42 also outputs the optical signals λ1 of the time slots t1 and t2 from an output port connected to the optical receiver 26n.

In step S7, in the reception nodes 18a to 18n, the optical signal λ2 of the time slot t1 received by the optical receiver 26a is relayed and transmitted to a communication terminal. Similarly, the optical signal λn of the time slot t1 received by the optical receiver 26c and the optical signals λn of the time slots t1 and t2 received by the optical receiver 26n are relayed and transmitted to the communication terminals.

In such an optical transmission system 10B, the optical demultiplexer 40 including the optical gate switches 41a to 41n that performs only simple on/off operation and the cAWG 42 that is a passive component in the subsequent stage is used. Due to this, in the optical demultiplexer 40, shifting or narrowing of the transmission band as in an active filter is eliminated. Accordingly, it is possible to eliminate a variation in transmission wavelength when an optical signal of a predetermined wavelength is transmitted and to properly transmit an optical signal of a target wavelength, such that communication interruption can be suppressed. In addition, the optical demultiplexer 40 having a simple configuration can realize such processing, such that the cost can be reduced.

Configuration of Second Embodiment

Figure 8:
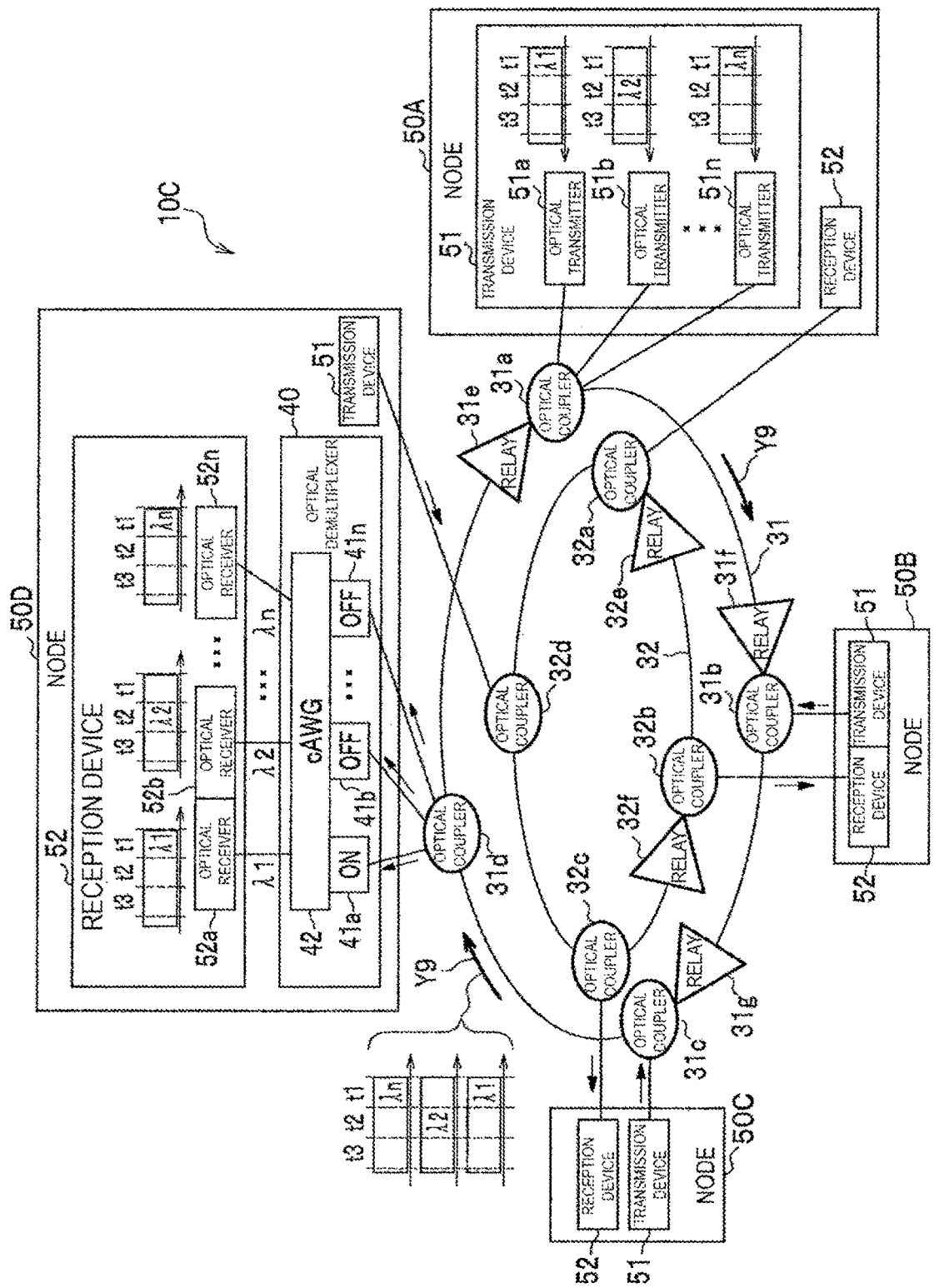
FIG. 8 is a block diagram illustrating an optical transmission system to which an optical demultiplexer according to a second embodiment of the present invention is applied, the optical transmission system having a link configuration.

FIG. 8 is a block diagram illustrating an optical transmission system to which an optical demultiplexer according to a second embodiment of the present invention is applied, the optical transmission system having a link configuration.

An optical transmission system 10C illustrated in FIG. 8 has a dual ring configuration using two optical fibers 31a nd 32 each having a ring shape. A plurality of optical couplers 31a, 31b, 31c, 31d (first optical couplers) and a plurality of relays 31e, 31f, 31g each including an optical amplifier are interposed and connected in the outer optical fiber 31. A plurality of optical couplers 32a, 32b, 32c, 32d (second optical couplers) and a plurality of relays 32e, 32f each including an optical amplifier are connected in the inner optical fiber 32.

A transmission device 51 of a node 50A (first node) for transmitting and receiving an optical signal and performing predetermined processing is connected to the optical coupler 31a connected in the outer optical fiber 31. A transmission device 51 of a node 50B is connected to the optical coupler 31b, a transmission device 51 of a node 50C is connected to the optical coupler 31c, and a transmission device 51 of a node 50D (second node) is connected to the optical coupler 31d.

A reception device 52 of the node 50A is connected to the optical coupler 32a connected in the inner optical fiber 32, a reception device 52 of the node 50B is connected to the optical coupler 32b, a reception device 52 of the node 50C is connected to the optical coupler 32c, and a reception device 52 of the node 50D is connected to the optical coupler 32d (connection lines are not illustrated).

The transmission device 51 includes n optical transmitters 51a, 51b, . . . , and 51n, as representatively illustrated for the node 50A.

The reception device 52 includes n optical receivers 52a, 52b, . . . , and 52n and the optical demultiplexer 40 described above, as representatively illustrated for the node 50D. The optical gate switches 41a to 41n of the optical demultiplexer 40 are connected to the optical coupler 31d. The output ports of the cAWG 42 are connected to the optical receivers 52a, 52b, . . . , and 52n. Here, the other nodes 50A to 50C each also include the optical demultiplexer 40, although not illustrated.

The outer optical fiber 31 transmits an optical signal in a clockwise direction, as indicated by an arrow Y9. The inner optical fiber 32 transmits an optical signal in a counter-clockwise direction opposite to the clockwise direction. During these transmissions, the relays 31e, 31f, and 31g and the relays 32e and 32f amplify and relay the optical signal. The optical couplers 31a to 31d and the optical couplers 32a to 32d perform coupling (multiplexing) or branching of an optical signal.

It is assumed that in such a configuration, optical signals of wavelengths λ1 to λn (optical signals λ1 to λn) are transmitted from the optical transmitters 51a, 51b, . . . , and 51n of the node 50A toward the node 50D as follows.

That is, the optical transmitter 51a stores an optical signal λ1 in a time slot t1 and transmits the optical signal λ1 stored in the time slot t1 to the optical coupler 31a. The optical transmitter 51b stores an optical signal λ2 in a time slot t2 and transmits the optical signal λ2 stored in the time slot t2 to the optical coupler 31a, and the optical transmitter 51n stores an optical signal λn in the time slot t1 and transmits the optical signal λn stored in the time slot t1 to the optical coupler 31a.

The optical coupler 31a multiplexes the transmitted optical signals λ1, λ2, . . . , and λn by TWDM, and transmits the multiplexed optical signal λ1 to λn in the clockwise direction indicated by the arrow Y9 via the outer optical fiber 31. At this time, the multiplexed optical signals λ1 to λn are amplified and relayed by the relays 31f and 31g.

The relayed multiplexed optical signal λ1 to λn is branched into the number (n) of the optical gate switches 41a to 41n at the optical coupler 31d, and transmitted to the optical gate switches 41a to 41n via an optical fiber.

Here, when it is assumed that only the optical gate switch 41a is turned on, the optical gate switch 41a transmits the multiplexed optical signal λ1 to λn from the optical coupler 31d and outputs the optical signal to a first input port of the cAWG 42.

The cAWG 42 performs wavelength routing processing on the multiplexed optical signals λ1, λ2, . . . , and λn of the time slots t1 and t2 input from the first input port. This wavelength routing processing causes the cAWG 42 to output the optical signal λ1 of the time slot t1 from an output port connected to the optical receiver 52a. A reception device 52a receives the optical signal λ1.

Similarly, the cAWG 42 outputs the optical signal λ2 of the time slot t2 from an output port connected to the optical receiver 52b. A reception device 52b receives the optical signal λ2. In addition, the cAWG 42 outputs the optical signal λn of the time slot t1 from an output port connected to the optical receiver 52n. A reception device 52n receives the optical signal λn. In this way, the optical signals λ1 to λn transmitted from the node 50A are received at the node 50D.

In the optical transmission system 10C, the optical demultiplexer 40 used in a network having a ring configuration includes only the optical gate switches 41a to 41n that performs only a simple on/off operation and the cAWG 42 which is a passive component in the subsequent stage. Due to this, in the optical demultiplexer 40, shifting or narrowing of the transmission band as in an active filter is eliminated. Accordingly, it is possible to eliminate a variation in transmission wavelength when an optical signal of a predetermined wavelength is transmitted and to properly transmit an optical signal of a target wavelength, such that communication interruption can be suppressed. In addition, the optical demultiplexer 40 having a simple configuration can realize such processing, such that the cost can be reduced.

Configuration of Third Embodiment

Figure 9:
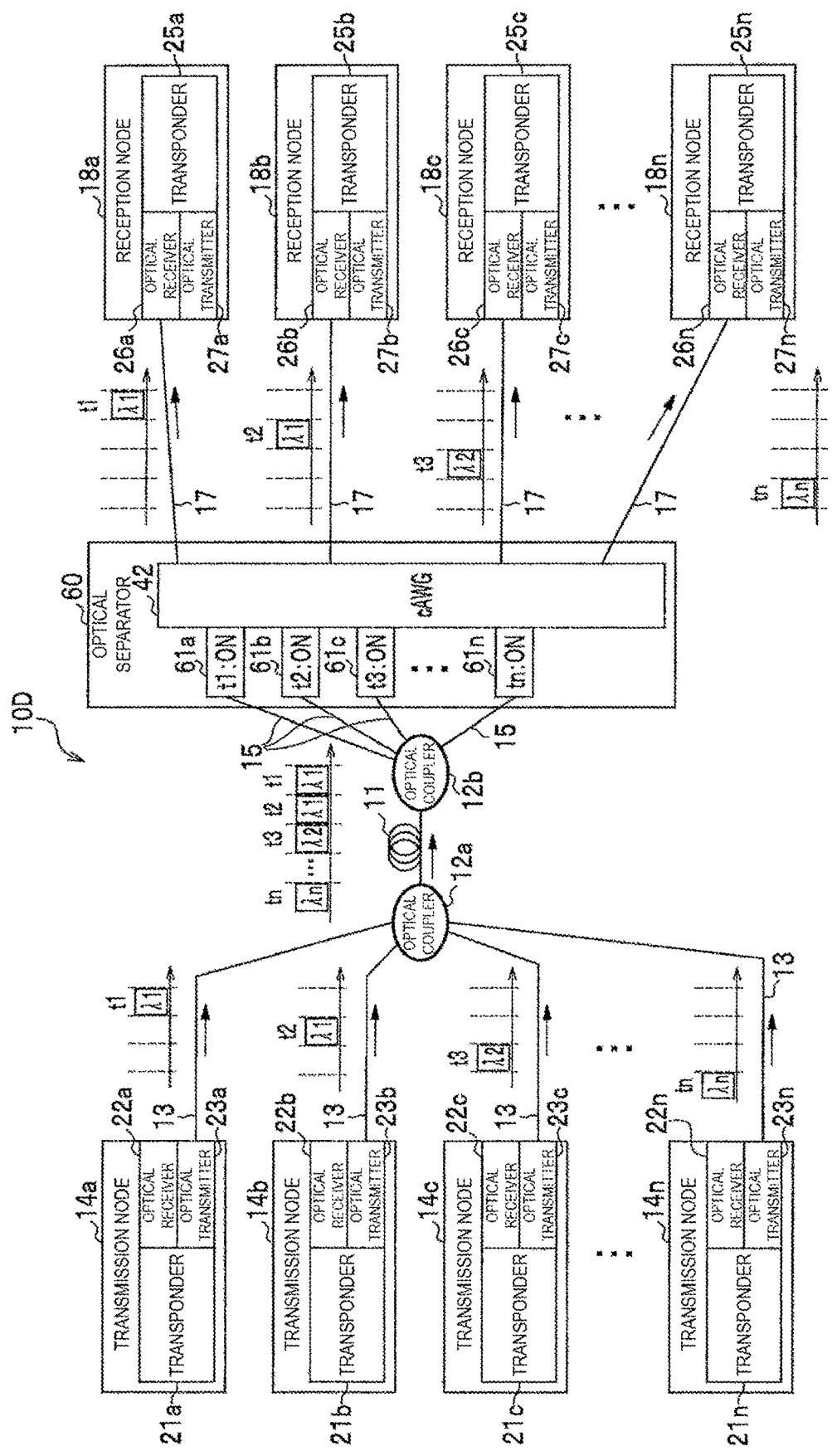
FIG. 9 is a block diagram illustrating an optical transmission system to which an optical separator according to a third embodiment of the present invention is applied, the optical transmission system having a star configuration.

FIG. 9 is a block diagram illustrating an optical transmission system to which an optical separator according to a third embodiment of the present invention is applied, the optical transmission system having a star configuration.

An optical transmission system 10D illustrated in FIG. 9 is different from the optical transmission system 10B according to the first embodiment (see FIG. 1) in that an optical separator 60 is used in place of the optical demultiplexer 40. The optical separator 60 includes n optical gate switches 61a, 61b, 61c, . . . , and 61n that perform an on/off operation at a high speed, and the cAWG 42 as described above.

The optical gate switches 61a to 61n are capable of transmitting an optical signal of a single wavelength in a burst unit (one packet). In other words, the optical gate switches 61a to 61n are capable of separating wavelengths λ1 to λn of the optical signal in a time unit. For example, the optical gate switch 61a is turned on only during a time slot t1 and transmits only an optical signal λ1 of the time slot t1 of time-division-multiplexed optical signals λ1, λ2, . . . , and λn by TDM transmitted from the optical coupler 12b.

Similarly, the optical gate switch 61b is turned on only during a time slot t2 and transmits only an optical signal λ1 of the time slot t2. The optical gate switch 61c is turned on only during a time slot t3 and transmits only an optical signal λ2 of the time slot t3. The optical gate switch 61n is turned on only during a time slot tn and transmits only an optical signal λn of the time slot tn.

The cAWG 42 performs wavelength routing processing on the optical signals λ1, λ2, . . . , and λn transmitted as described above. This wavelength routing processing causes the cAWG 42 to output the optical signals λ1 of the time slot t1 from an output port connected to the optical receiver 26a. The cAWG 42 also outputs the optical signal λ2 of the time slot t2 from an output port connected to the optical receiver 26b. The cAWG 42 also outputs the optical signal λn of the time slot tn from an output port connected to the optical receiver 26n.

In such a configuration, first, the optical signals λ1, λ1, λ2, . . . , and λn on which information received from a communication terminal is superimposed are transmitted to the optical coupler 12a by the transmission nodes 14a to 14n. At this time, the transmission node 14a stores the optical signal λ1 in the time slot t1 and transmits the optical signal λ1 stored in the time slot t1, the transmission node 14b stores the optical signal λ1 in the time slot t2 and transmits the optical signal λ1 stored in the time slot t2, the transmission node 14c stores the optical signal λ2 in the time slot t3 and transmits the optical signal λ2 stored in the time slot t3, and the transmission node 14n stores the optical signal λn in the time slot tn and transmits the optical signal λn stored in the time slot tn.

The optical coupler 12a time-division multiplexes the optical signals λ1 to λn of the time slots t1 to tn from the transmission nodes 14a to 14n, and transmits the multiplexed optical signal λ1 to λn of the time slots t1 to tn to the other optical coupler 12b via the optical fiber 11. However, in the present example, the optical signals λ1 to λn are time-division multiplexed, but may be time- and wavelength-division multiplexed.

The optical coupler 12b branches the multiplexed optical signal λ1 to λn of the time slots t1 to tn from the optical fiber 11 into n pieces, and transmits the branched signals to the n optical gate switches 61a to 61n via the optical fiber 15.

The optical gate switches 61a to 61n each are turned on only during a predetermined time slot to transmit an optical signal, as follows. That is, the optical gate switch 61a is turned on only during the time slot t1 to transmit only the optical signal λ1, and the optical gate switch 61b is turned on only during the time slot t2 to transmit only the optical signal λ1. The optical gate switch 61c is turned on only during the time slot t3 to transmit only the optical signal λ2. The optical gate switch 61n is turned on only during the time slot tn to transmit only the optical signal λn.

The cAWG 42 performs wavelength routing processing on the optical signals λ1 to λn transmitted as described above to output the optical signal λ1 of the time slot t1 to the optical receiver 26a and to output the optical signal λ1 of the time slot t2 to the optical receiver 26b. The cAWG 42 also outputs the optical signal λ2 of the time slot t3 to the optical receiver 26c and outputs the optical signal λn of the time slot tn to the optical receiver 26n. The optical signals λ1, λ2, . . . , and λn received by the optical receivers 26a to 26n are relayed to communication terminals by the transponders 25a to 25n.

The optical separator 60 used in such an optical transmission system 10D includes only the optical gate switches 61a to 61n that perform only a simple on/off operation, the optical gate switches capable of transmitting and separating the multiplexed optical signal λ1 to λn for each optical signal of a single wavelength (one packet), and the cAWG 42 that is a passive component in the subsequent stage.

Due to this, in the optical separator 60, shifting or narrowing of the transmission band as in an active filter is eliminated. Accordingly, it is possible to eliminate a variation in transmission wavelength when an optical signal having a predetermined wavelength is transmitted and to properly transmit an optical signal having a target wavelength, such that communication interruption can be suppressed. In addition, the optical separator 60 having a simple configuration can realize such processing, such that the cost can be reduced. It is possible to realize such an effect in a flexible network.

However, also when the optical separator 60 is used in place of the optical demultiplexer 40 of the optical transmission system 10C having a ring configuration illustrated in FIG. 8, the same effects as the optical transmission system 10D can be obtained.

Effects (1) The optical demultiplexer 40 includes the plurality of optical gate switches 41a to 41n configured to transmit, when being turned on, and block, when being turned off, a multiplexed optical signal, the multiplexed optical signal obtained by multiplexing optical signals of a plurality of wavelengths by time-division multiplexing or wavelength-division multiplexing in addition to time-division multiplexing, and the cAWG 42 including a plurality of input ports and a plurality of output ports and configured to input the multiplexed optical signal transmitted through the optical gate switches 41a to 41n from the plurality of input ports, demultiplex the input multiplexed optical signal for each wavelength, and cycle and output the demultiplexed optical signals from the plurality of output ports in a predetermined order.

According to this configuration, the optical demultiplexer 40 can be configured by including the optical gate switches 41a to 41n that perform only a simple on/off operation and the cAWG 42 that is a passive component in the subsequent stage. According to this optical demultiplexer 40, shifting or narrowing of the transmission band as in an active filter is eliminated. Accordingly, when the optical demultiplexer 40 is used on the input side of the reception nodes 18a to 18n of an optical network, it is possible to eliminate a variation in transmission wavelength when an optical signal of a predetermined wavelength is transmitted and to properly transmit an optical signal of a target wavelength, such that communication interruption can be suppressed. In addition, the optical demultiplexer 40 can be realized with the simple configuration described above, such that the cost can be reduced.

(2) The optical separator 60 includes the plurality of optical gate switches 61a to 61n configured to perform an on operation that transmits an optical signal of a single wavelength in a time unit and an off operation that blocks an optical signal, the plurality of optical gate switches 61a to 61n being configured to, at the time of inputting a multiplexed optical signal obtained by time-division multiplexing optical signals of a plurality of wavelengths, perform the on operation only during a time slot of a predetermined time in performing the time-division multiplexing to separate an optical signal of a single wavelength stored in the time slot, and the cAWG 42 including a plurality of input ports and a plurality of output ports and configured to input the optical signal of the single wavelength transmitted through the optical gate switches 61a to 61n from the plurality of input ports, and cycle and output the input optical signal of the single wavelength from the plurality of output ports in a predetermined order.

According to this configuration, the optical separator 60 can be configured by including the optical gate switches 61a to 61n configured to performs only a simple on/off operation consisting of an on operation that transmits an optical signal of a single wavelength in a time unit and an off operation that blocks an optical signal, and the cAWG 42 that is a passive component in the subsequent stage. According to this optical separator 60, shifting or narrowing of the transmission band as in an active filter is eliminated. Accordingly, when the optical separator 60 is used on the input side of the reception nodes 18a to 18n of the optical network, it is possible to eliminate a variation in transmission wavelength when an optical signal of a predetermined wavelength is transmitted and to properly transmit an optical signal of a target wavelength, such that communication interruption can be suppressed.

(3) When a multiplexed optical signal obtained by multiplexing optical signals of a plurality of wavelengths by wavelength-division multiplexing in addition to time-division multiplexing is input, the optical gate switches 61a to 61n according to (2) above perform the on operation only during a time slot of a predetermined time when the time-division multiplexing is performed to separate an optical signal of a single wavelength stored in the time slot, and the cAWG 42 inputs the optical signal of the single wavelength transmitted through the optical gate switches 61a to 61n from the plurality of input ports, demultiplexes the input optical signal of the single wavelength, and cycles and outputs the demultiplexed optical signals from the plurality of output ports in a predetermined order.

According to this configuration, even if the multiplexed optical signal is a signal obtained by multiplexing optical signals of a plurality of wavelengths by wavelength-division multiplexing in addition to time-division multiplexing, an optical signal of a single wavelength can be separated by the optical gate switches 41a to 41n, and the multiplexed optical signal can be demultiplexed for each wavelength by the cAWG 42. Thus, an optical signal of a predetermined single wavelength can be output from the optical separator 60.

(4) The optical transmission system 10B includes: a plurality of transmission nodes 14a to 14n configured to transmit optical signals of a plurality of wavelengths; one optical coupler 12a configured to multiplex the optical signals of a plurality of wavelengths transmitted from the plurality of transmission nodes 14a to 14n by time-division multiplexing or wavelength-division multiplexing in addition to time-division multiplexing; the other optical coupler 12b connected to the one optical coupler 12a via an optical transmission line and configured to branch the multiplexed optical signal transmitted in the optical transmission line; and a plurality of reception nodes 18a to 18n connected to the optical demultiplexer 40 described in (1) above to which the other optical coupler 12b is connected, in which the multiplexed optical signal branched by the other optical coupler 12b is transmitted through each of the optical gate switches 41a to 41n of the optical demultiplexer 40 and optical signals obtained by demultiplexing the transmitted multiplexed optical signal for each wavelength by the optical demultiplexer 40 are received at the reception nodes 18a to 18n.

According to this configuration, in the optical demultiplexer 40, shifting or narrowing of the transmission band as in an active filter is eliminated. Accordingly, in the optical transmission system, it is possible to eliminate a variation in transmission wavelength when an optical signal of a predetermined wavelength is transmitted, and to properly transmit an optical signal of a target wavelength, such that communication interruption can be suppressed.

(5) The optical transmission system 10C includes: an optical transmission line (optical fibers 31, 32) having a ring shape; a first optical coupler 31a connected to the optical transmission line and configured to multiplex optical signals of a plurality of wavelengths by time-division multiplexing or wavelength-division multiplexing in addition to time-division multiplexing; a second optical coupler 31d connected to the optical transmission line and configured to branch an optical signal multiplexed by the first optical coupler 31a; a first node 50A connected to the first optical coupler 31a and having a plurality of optical transmitters 51a to 51n configured to transmit optical signals of a plurality of wavelengths; and a second node having the optical demultiplexer 40 described in (1) above connected to the second optical coupler 31d and a plurality of optical receivers 52a to 52n configured to receive optical signals from the plurality of optical transmitters 51a to 51n via the optical demultiplexer 40, wherein optical signals of a plurality of wavelengths transmitted from the plurality of optical transmitters 51a to 51n are multiplexed by the first optical coupler, the multiplexed optical signal is transmitted through each of the optical gate switches 41a to 41n of the optical demultiplexer 40, and optical signals obtained by demultiplexing the transmitted multiplexed optical signal for each wavelength by the optical demultiplexer 40 are received by the optical receivers 52a to 52n.

According to this configuration, in an optical transmission system having a ring configuration as well, similarly to the optical transmission system of (4), it is possible by the optical demultiplexer 40 to eliminate a variation in transmission wavelength when an optical signal of a predetermined wavelength is transmitted, and to properly transmit an optical signal of a target wavelength, such that communication interruption can be suppressed.

(6) The optical transmission system 10D includes: a plurality of transmission nodes 14a to 14n configured to transmit optical signals of a plurality of wavelengths; one optical coupler 12a configured to transmit a multiplexed optical signal obtained by multiplexing the optical signals of a plurality of wavelengths transmitted from the plurality of transmission nodes 14a to 14n by time-division multiplexing; the other optical coupler 12b connected to the one optical coupler 12a via an optical transmission line and configured to branch the multiplexed optical signal transmitted in the optical transmission line; and a plurality of reception nodes 18a to 18n connected to the optical separator 60 described in (2) above to which the other optical coupler 12b is connected, wherein the multiplexed optical signal branched by the other optical coupler 12b is transmitted through each of the optical gate switches 61a to 61n of the optical separator 60, and optical signals obtained by separating the transmitted multiplexed optical signal for each time slot in the optical separator 60 are received at the reception nodes 18a to 18n.

According to this configuration, in the optical separator 60 used in the optical transmission system, shifting or narrowing of the transmission band as in an active filter is eliminated. Accordingly, in the optical transmission system, it is possible to eliminate a variation in transmission wavelength when an optical signal of a predetermined wavelength is transmitted, and to properly transmit an optical signal of a target wavelength, such that communication interruption can be suppressed.

(7) The optical transmission system 10D includes: the optical separator 60 described in (3) above; a plurality of transmission nodes 14a to 14n configured to transmit optical signals of a plurality of wavelengths; one optical coupler 12a configured to transmit a multiplexed optical signal obtained by multiplexing the optical signals of a plurality of wavelengths transmitted from the plurality of transmission nodes 14a to 14n by wavelength-division multiplexing in addition to time-division multiplexing; the other optical coupler 12b connected to the one optical coupler 12a via an optical transmission line and configured to branch the multiplexed optical signal transmitted in the optical transmission line; and a plurality of reception nodes 18a to 18n connected to the optical separator 60 to which the other optical coupler 12b is connected, wherein the multiplexed optical signal branched by the other optical coupler 12b is transmitted through each of optical gate switches 41a to 41n of the optical separator 60, and optical signals obtained by demultiplexing the transmitted multiplexed optical signal for each time slot in the optical separator 60 are received at the reception nodes 18a to 18n.

According to this configuration, similarly to the optical transmission system 10D described in (6) above, in the optical separator 60, shifting or narrowing of the transmission band as in an active filter is eliminated. Accordingly, in the optical transmission system, it is possible to eliminate a variation in transmission wavelength when an optical signal of a predetermined wavelength is transmitted, and to properly transmit an optical signal of a target wavelength, such that communication interruption can be suppressed.

In addition, a specific configuration can be appropriately changed without departing from the gist of the present disclosure.

REFERENCE SIGNS LIST 10B, 10C, 10D Optical transmission system
11, 31, 32 Optical fiber
12a, 12b Optical coupler
14a to 14n Transmission node
18a to 18n Reception node
21a to 21n, 25a to 25n Transponder
22a to 22n, 27a to 27n Optical receiver
23a to 23n, 26a to 26n Optical transmitter
31a to 31d, 32a to 32d Optical coupler
31e, 31f, 31g, 32e, 32f Relay
50A to 50D Node
40 Optical demultiplexer
41a to 41n, 61a to 61n Optical gate switch
42 cAWG
51 Transmission device
51a to 51n Optical transmitter 52 Reception device
52a to 52n Optical receiver
60 Optical separator

The invention claimed is:

1. An optical demultiplexer, comprising:
a plurality of optical gate switches, each of which is configured to transmit, when being turned on, and to block, when being turned off, a multiplexed optical signal received from one optical coupler,
the multiplexed optical signal being obtained by multiplexing optical signals of a plurality of wavelengths by time-division multiplexing or multiplexing optical signals of a plurality of wavelengths by wavelength-division multiplexing in addition to time-division multiplexing; and
a cyclic arrayed waveguide grating (cAWG) including a plurality of input ports and a plurality of output ports and configured to input the multiplexed optical signal transmitted through the plurality of optical gate switches from the plurality of input ports, demultiplex the input multiplexed optical signal for each wavelength, and cycle and output the demultiplexed optical signals from the plurality of output ports in a predetermined order.

2. An optical separator, comprising:
a plurality of optical gate switches, each of which is configured to perform i) an on operation for transmitting an optical signal of a predetermined single wavelength in a predetermined time slot and ii) an off operation for blocking an optical signal,
each of the plurality of optical gate switches performing, when a multiplexed optical signal obtained by multiplexing optical signals of a plurality of wavelengths by time-division multiplexing is input, the on operation during a corresponding predetermined time slot when the time-division multiplexing is performed, to separate an optical signal of a corresponding single wavelength stored in the corresponding predetermined time slot; and
a cAWG including a plurality of input ports and a plurality of output ports and configured to input the optical signal of the predetermined single wavelength transmitted through the plurality of optical gate switches from the plurality of input ports, and cycle and output the input optical signal of the predetermined single wavelength from the plurality of output ports in a predetermined order.

3. The optical separator according to claim 2, wherein when the multiplexed optical signal obtained by multiplexing optical signals of a plurality of wavelengths by wavelength-division multiplexing in addition to the time-division multiplexing is input, each of the plurality of optical gate switches performs the on operation during the corresponding predetermined time slot when the time-division multiplexing is performed, to separate an optical signal of the corresponding single wavelength stored in the corresponding predetermined time slot, and
the cAWG inputs the optical signal of the predetermined single wavelength transmitted through the optical gate switches from the plurality of input ports, demultiplexes the input optical signal of the predetermined single wavelength, and cycles and outputs the demultiplexed optical signals from the plurality of output ports in a predetermined order.

4. An optical transmission system, comprising:
a plurality of transmission nodes configured to transmit optical signals of a plurality of wavelengths;
one optical coupler configured to multiplex the optical signals of a plurality of wavelengths transmitted from the plurality of transmission nodes by time-division multiplexing or wavelength-division multiplexing in addition to time-division multiplexing;
a second optical coupler connected to the one optical coupler via an optical transmission line and configured to branch the multiplexed optical signal transmitted in the optical transmission line; and
a plurality of reception nodes connected to the optical demultiplexer described in claim 1 to which the second optical coupler is connected, wherein
the multiplexed optical signal branched by the second optical coupler is transmitted through each of the optical gate switches of the optical demultiplexer and optical signals obtained by demultiplexing the transmitted multiplexed optical signal for each wavelength by the optical demultiplexer are received at the reception nodes.

5. An optical transmission system, comprising:
an optical transmission line having a ring shape;
a first optical coupler connected to the optical transmission line and configured to multiplex optical signals of a plurality of wavelengths by time-division multiplexing or wavelength-division multiplexing in addition to time-division multiplexing, thereby generating a multiplexed optical signal;
a second optical coupler connected to the optical transmission line and configured to branch the multiplexed optical signal multiplexed by the first optical coupler;
a first node connected to the first optical coupler and having a plurality of optical transmitters configured to transmit optical signals of a plurality of wavelengths; and
a second node having the optical demultiplexer described in claim 1 connected to the second optical coupler and a plurality of optical receivers configured to receive optical signals from the plurality of optical transmitters via the optical demultiplexer, wherein
optical signals of a plurality of wavelengths transmitted from the plurality of optical transmitters are multiplexed by the first optical coupler, the multiplexed optical signal is transmitted through each of the optical gate switches of the optical demultiplexer, and optical signals obtained by demultiplexing the transmitted multiplexed optical signal for each wavelength by the optical demultiplexer are received by the optical receivers.

6. An optical transmission system, comprising:
a plurality of transmission nodes configured to transmit optical signals of a plurality of wavelengths;
one optical coupler configured to transmit a multiplexed optical signal obtained by multiplexing the optical signals of a plurality of wavelengths transmitted from the plurality of transmission nodes by time-division multiplexing;
a second optical coupler connected to the one optical coupler via an optical transmission line and configured to branch the multiplexed optical signal transmitted in the optical transmission line; and
a plurality of reception nodes connected to the optical separator described in claim 2 to which the second optical coupler is connected, wherein the multiplexed optical signal branched by the second optical coupler is transmitted through each of the optical gate switches of the optical separator, and optical signals obtained by separating the transmitted multiplexed optical signal for each time slot in the optical separator are received at the plurality of reception nodes.

7. An optical transmission system, comprising:

a plurality of transmission nodes configured to transmit optical signals of a plurality of wavelengths;

one optical coupler configured to transmit a multiplexed optical signal obtained by multiplexing the optical signals of a plurality of wavelengths transmitted from the plurality of transmission nodes by wavelength-division multiplexing in addition to time-division multiplexing;

a second optical coupler connected to the one optical coupler via an optical transmission line and configured to branch the multiplexed optical signal transmitted in the optical transmission line; and a plurality of reception nodes connected to the optical separator described in claim 3 to which the second optical coupler is connected, wherein the multiplexed optical signal branched by the second optical coupler is transmitted through each of the optical gate switches of the optical separator, and optical signals obtained by demultiplexing the transmitted multiplexed optical signal for each time slot in the optical separator are received at the plurality of reception nodes.

8. An optical transmission method of an optical transmission system, the method comprising:

transmitting optical signals of a plurality of wavelengths from a plurality of transmission nodes;

multiplexing the transmitted optical signals of a plurality of wavelengths by time-division multiplexing or wavelength-division multiplexing in addition to time-division multiplexing by one optical coupler;

transmitting the multiplexed optical signal to a second optical coupler via an optical transmission line;

branching the transmitted multiplexed optical signal by the second optical coupler; and receiving optical signals obtained by the branching by a plurality of reception nodes, wherein an optical demultiplexer for demultiplexing the multiplexed optical signal transmitted in the optical transmission line for each wavelength is provided for the plurality of reception nodes, the optical demultiplexer performs:

transmitting or blocking the multiplexed optical signal transmitted in the optical transmission line; and demultiplexing the transmitted multiplexed optical signal for each wavelength, and cycling and delivering optical signals obtained by the demultiplexing to the plurality of reception nodes in a predetermined order.

* * * * *